INVENTOR.
Lynn S. Burgett
BY Harry P. Canfield
ATTORNEY.

Patented Nov. 12, 1940

2,220,990

UNITED STATES PATENT OFFICE 2,220,990

CONNECTOR FOR THE LIQUID COOLING AND ELECTRIC SYSTEMS OF WELDING APPARATUS

Lynn S. Burgett, Euclid, Ohio, assignor to The Clark Controller Company, Cleveland, Ohio, a corporation of Ohio Application December 9, 1938, Serial No. 244,788

12 Claims. (Cl. 219—4)

This invention relates to electric welding apparatus and more particularly to the conduit system by which cooling liquid is conducted to and through parts of the apparatus, and the electrical system by which welding current is conducted to the apparatus.

While my invention may be applied to electric welding apparatus of different types it is particularly advantageous when applied to welding apparatus of the so-called spot welding gun type.

In such welding apparatus, which comprises electrodes arranged to be pressure-engaged with work to be welded and electric conductors for conducting electric welding current to the engaged electrodes to effect a weld at the work, it is customary to circulate cooling liquid, for example water, through chambers or passageways in the electrodes or in the electrode carrying parts and in some cases through the electric conductors, which may be in the form of a cable or cables. The welding gun is usually movable so that it can be moved by the operator to position the electrodes with respect to the work, and the current conducting cable, and in some cases the cooling liquid conduits, because of their inherent stiffness, interfere with the movement of the gun.

Among the objects of this invention are:

To provide generally an improved cooling liquid conduit system for welding machines of the movable type;

To provide improved means for supporting at a welding machine, the cooling liquid conduit means connected therewith;

To provide improved means for supporting at a welding machine, a welding current conductor or conductors;

To provide improved means for supporting at a welding machine, a welding current conducting cable of the liquid cooled type.

Other objects will be apparent to those skilled in the art to which my invention appertains.

My invention is fully disclosed in the following description taken in connection with the accompanying drawing in which.

Figure 1:
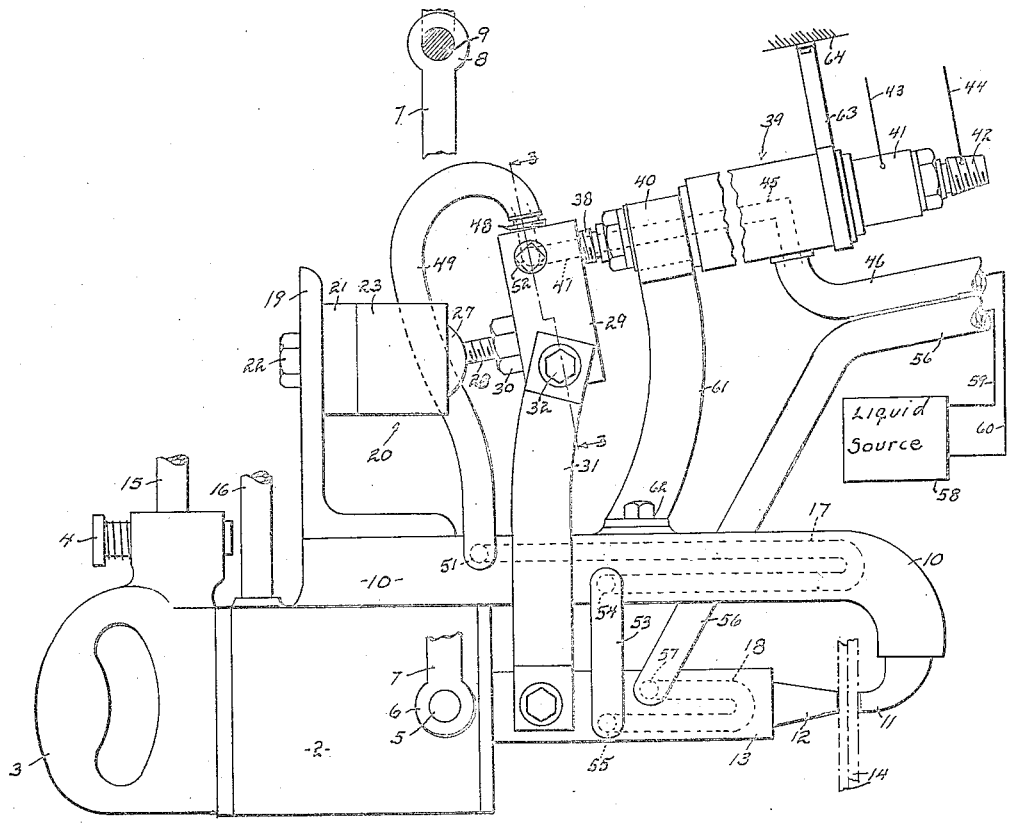
Fig. 1 is an elevational view illustrating an embodiment of my invention associated with a welding machine of the gun type.

As stated hereinbefore my invention has particular advantages when applied to a welding machine of the gun type and for this reason I have so illustrated it in Fig. 1.

At 1 is illustrated generally the welding gun comprising a cylinder 2, a handle 3, and an operator's valve 4. A trunnion 5 on the cylinder (which may be one of a pair of trunnions, the other being on the other side of the cylinder 2 and therefore not shown) has telescoped thereover the eye 6 of a link 7, the upper end of which is provided with an eye 8, through which a link 9 of a chain or the like may be looped to thereby provide a support for the gun 1.

By this means the gun may be rocked around the axis of the trunnion 5, or may be rocked around the axes of the link 7 in a well known manner.

At 10 is a stationary electrode support, carrying an electrode 11, the support 10 being mounted in a suitable manner upon the cylinder 2. At 12 is the other electrode mounted on an electrode support 13, which is reciprocable horizontally, as viewed in the drawing, the electrode support 13 being connected to or constituting a piston rod projecting into the cylinder 2 and connected to a piston therein, not shown.

As is well known with guns of this type, when air or other fluid pressure is admitted to the cylinder 2, the electrode support 13 and the electrode 12 carried thereby will be projected forwardly, toward the right as viewed in the drawing, to engage work pieces 14—14 under pressure between the electrodes 12 and 11, to be welded, and when the fluid pressure is released, the piston will be retracted by a spring or like means, not shown, and withdraw the electrode support 13 and the electrode 12 from the work to permit the electrodes to be moved to another position.

At 15 is indicated a fluid pressure supply conduit which may be connected to a source of fluid pressure, and the fluid pressure admission to the cylinder 2 is under the control of the valve 4. A fluid pressure conduit 16 connected to the cylinder may be provided and the "back-pressure" therein may be utilized to operate or control a current-timing electric contactor to close and after a time interval open an electric circuit to the electrodes 11 and 12.

The electrode supports 10 and 13 are provided respectively with chambers 17 and 18 through which cooling liquid may be circulated or caused to flow, in a manner to be described, to conduct accumulating heat away from the electrode supports and electrodes, caused by heating at the welds being made.

The parts thus far described are well known and constitute no essential part of the present invention and may be variously constructed and for this reason have been illustrated in some cases diagrammatically and in other cases more simply than in the actual structures thereof, it being believed that such a showing will be clear to those skilled in the art.

By means of the mobility of the gun above described, the electrodes 11 and 12 may be moved to position them with respect to the work 14 to be welded as may be desired, by the operator who grasps the handle 3 of the gun.

At 19 is a bracket mounted on the upper side of the electrode support 10. On the bracket is mounted a device 20, also shown in more detail in Figs. 2 and 3. It comprises a base member 21 secured to the bracket 19 by a bolt 22 projected through the bracket and threaded into the base, and a sleeve 23 threaded on the base 21, as at 24. The base 21 has a socket 25 therein and the sleeve 23 has a flange 26 projecting inwardly; and between the socket 25 and the flange 26 is disposed an enlarged joint element 27. A stud 28 is connected to the joint element 27 and a head 29, to be described, is threaded upon the stud 28 and locked in any rotative position therearound by the lock nut 30.

The joint element 27 may have any suitable or desired construction and form, but I prefer to make it in the form of a sphere or ball mounted on the end of the stud 28, by making the stud and ball integral or by screwing the stud 28 into the ball, and it will be so referred to hereinafter.

The socket 25 is accordingly preferably spherical, as is the inner surface of the flange 26, and the flange 26 is disposed opposite the surface of the ball outwardly of its center whereby the ball 27 is trapped in the device 20 and whereby the stud 28 and the head 29 thereon may be rocked or hingingly moved universally on the device 20 around the center of the ball 27.

Figures 2, 3:
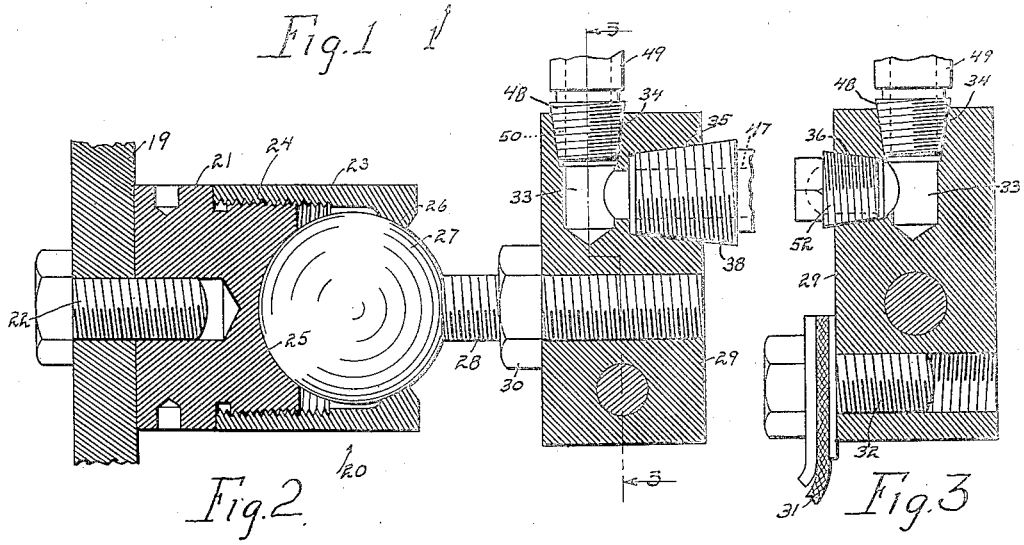
Fig. 2 is a longitudinal sectional view to an enlarged scale of a part of the embodiment of Fig. 1.
Fig. 3 is a sectional view taken from the plane 3—3 of Fig. 2, and the view may be considered as taken from the plane 3—3 of Fig. 1, and drawn to an enlarged scale.

The head 29 is made preferably from electrically conducting material, such as copper, for a purpose to be described, and provision is made to elecrically connect thereto an electrical connector, such as that illustrated at 31. The connector 31, as best shown in Fig. 3, is preferably made from strands of wire woven together, and the connector may be electrically connected to the head 29, by a bolt 32, projected through the connector and threaded into the head 29. The strands of the connector 31, as well as those of a similar connector 61, to be referred to, are omitted in Fig. 1 for simplicity.

The head 29, besides functioning as an electric circuit element, as will presently be understood, functions also as an element in the cooling fluid system of the gun and to this end is provided with an internal recess or chamber 33 with which communicates threaded bores 34, 35 and 36.

Into the bore 35 is screwed an electric terminal 38 of an electric cable shown generally at 39, Fig. 1. The cable 39 comprises two conductors or two paths for electric current flowing therethrough, one of which terminates in the terminal 38 and the other in a terminal 40. The electrical conductors or current paths through the cable connect the terminal 40 with a corresponding terminal 41, and connect the terminal 38 with a corresponding terminal 42, both at the other end of the cable; and electric current may be supplied to the terminals 41 and 42 by wires 43 and 44.

The cable also has a cooling liquid conduit path therethrough, indicated at 45, this cooling fluid path communicating outwardly through the side of the cable, at its outer end, with a conduit 46 and at its inner end communicating through a duct 47 in the terminal 38 with the recess or chamber 33 in the head 29.

The bore 34 has screwed thereinto a conduit terminal 48 to which is connected a flexible conduit, for example a hose 49, a bore 50 in the conduit terminal 48 communicating with the interior of the hose 49.

The other end of the hose 49 is connected to the cooling liquid chamber 17 as at 51.

The other bore 36 in the head 29 is, in the embodiment of my invention illustrated, closed by a plug 52 threaded therein.

The cooling liquid chambers 17 and 18 are connected by a flexible conduit, such as a hose 53, communicating with the chambers at 54 and 55.

A conduit 56 is connected to the cooling fluid chamber 18 at 57.

The conduits 46 and 56 are connected to a "liquid source" 58, as indicated by the diagrammatic continuations of these conduits, 59 and 60 respectively.

The terminal 40 of the cable 39 is connected by a flexible electric conductor 61 to the electrode support 10 as at 62.

In the operation of the embodiment of my invention as above described, the electrodes 11 and 12 are first engaged with the work 14, and the welding current circuit is then closed by the well known means above referred to and current flows from the wire 44, to the cable terminal 42, through the cable to the terminal 38, into the head 29, through the head and by way of the flexible electrical connector 31, to the electrode support 13, through this support to the electrode 12, through the work 14 to the electrode 11, through the electrode support 10, by the flexible electrical connector 61 to the terminal 40, through the cable to the terminal 41 and to the other wire 43.

Cooling liquid is continuously circulated from the liquid source 58 by the conduit 59—56, through the cooling chamber or passageway 18, out through the conduit 53 to the cooling chamber or passageway 17, and through the conduit 49 to the head 29, into the recess or chamber 33, and out through the duct 47 in the cable terminal 38, into and through the liquid conduit 45 of the cable, out through the conduit 46—60 and back to the liquid source 58, performing the cooling function on the electrode supports and electrodes in the well known manner. The liquid source 58 may therefore comprise a supply of liquid and also any suitable means for causing it to flow and circulate through the said system; or the liquid source 58 may be a tap of a water supply system from which the liquid flows to the conduit 59—56, in which case the conduit 46—60 would, at the source 58, discharge into a waste sewer or the like.

It is to be understood that the outer end of the conduits 46 and 56 will be supported in some manner as is well known in practice, as is the outer end of the cable 39, the latter more particularly by the screwing of the terminal 42 into a corresponding receptacle at the source of electric current, so that normally the head 29 will take up a position determined largely by the position of the cable 39.

If now in the operation of the gun 1, above described, it be moved to raise or lower the electrodes 11 and 12 or to move them from side to side or forwardly and backwardly, such movement with respect to the conduits 46, 56 and 49 will be permitted by the natural flexibility of these conduits, which, although having some stiffness, do not seriously obstruct such movement. The cable 39, however, being stiffer and tending to interfere with the movement will tend to hold the block 29 from moving, but the hinging connection between the cable and the gun 1 or bracket 19 upon which the device 20 is mounted, permits the gun to be moved hingingly with respect to the head 29 and the cable 39 in all directions of movement of the gun.

The flexibility of the flexible electrical connectors 31 and 61 will permit them to bend or yield in their intermediate portions upon movement of the gun, notwithstanding that the ends spaced from the gun are rigidly connected to the stud 32 and terminal 40 of the cable respectively.

Stated in other words, the terminals 38 and 40 of the cable and therefore the head 29, because of the rigid threaded connection of the terminal 38 with the head 29, may be considered as remaining relatively stationary because of the stiffness of the cable 39; and the device 20 may be considered as hingingly moving with respect to the head 29 around the center of the ball 27 upon movement of the gun. In some cases, it may be desired to support a portion of the cable 39 separately from the support effected therefor through the threaded terminal 42, and to this end a strap or the like 63, may be provided supporting the cable and secured above the cable to a stationary support 64.

In the embodiment illustrated, the conduit 49 communicates with the interior chamber 33 of the head 29 through the bore 34, the bore 36 being plugged. If desired, the conduit 49 may be connected through the bore 36 to the chamber 33, in which case the bore 34 would be plugged.

The construction of the cable 39 above referred to constitutes no essential part of the present invention, such cables being known to those skilled in the art. Reference may be had, however, for a more complete description of such a cable to the pending patent application of Mackworth G. Rees, Serial Number 201,360 filed April 11, 1938, for Current delivering and conducting means.

With the means above described, in spite of stiffness of the cable 39, which might in fact be completely rigid, welding current may be supplied therethrough to the gun electrodes 11 and 12 without interfering with movement of the gun to position the electrodes with respect to the work 14.

My invention is not limited to the exact details of construction illustrated and described. For example, if only vertical movement of the electrodes 11 and 12 is wanted, the hinging connection between the head 29 and the device 20 may be one on a horizontal axis only; or if movement from side to side, that is to say, to and from the observer, as viewed in the drawing, is all that is wanted for the electrodes 11 and 12, the hinging movement may be one on a vertical axis only, and the parts of the device 20 may be correspondingly modified.

Also, the cooling liquid if desired may be caused to flow through the cable first and then through the gun by changing its direction at the source 58; or, as will be understood without further illustration, may be conducted first to the head 29, by connecting the conduit 56 to the head at the bore 36 (the plug 52 being removed for this purpose) and there may divide, part going through the cable and back to the source by conduit 46 and part going by conduit 49 to the gun and through it and back to the source by a conduit not shown.

Other changes and modifications may be made within the spirit of my invention without sacrificing its advantages, and within the scope of the appended claims.

I claim:

1. In combination with an electric welding machine of the type comprising a cooling-liquid passageway, a support, a conduit head hingedly mounted on the support, a cooling-liquid conduit connecting the head and the passageway and conduit means for conducting cooling liquid through the passageway, conduit and head.

2. In combination with an electric welding machine of the type that is movable with respect to work to be welded and comprising a cooling-liquid passageway, a conduit head hingedly supported on the machine, a flexible cooling-liquid conduit connecting the head and the passageway, and cooling-liquid supply conduit means connected to the head and to the passageway whereby cooling-liquid may be circulated through the passageway, conduit and head.

3. In combination with an electric welding machine of the type comprising electrodes having a cooling-liquid passageway and being movable with respect to the work to be welded, a conduit head hingedly connected to the machine, flexible cooling-liquid conduit means connecting the head and passageway, and conduit means for conducting cooling liquid through the electrode passageway, conduit means and head.

4. In combination with an electric welding machine of the type comprising electrodes having a cooling-liquid passageway and being movable with respect to work to be welded, a conduit head hingedly connected to the machine, flexible cooling-liquid conduit means connecting the head and passageway, and conduit means connected to the head and passageway for conducting cooling-liquid through the electrode passageway, conduit means and head.

5. In combination with an electric welding machine of the type comprising a pair of electrodes, a support, an electrically conducting head hingedly connected to the support, a welding current cable comprising two conductors, one conductor being connected to the head, a flexible electric connector connecting the head to one electrode and a flexible electric connector connecting the other conductor to the other electrode.

6. In combination with an electric welding machine of the type comprising a pair of electrodes that are movable with respect to work to be welded, an electrically conducting head hingedly supported on the machine, a pair of welding current conductors one being connected to the head, a flexible electric connector connecting the head to one electrode and a flexible electric connector connecting the other conductor to the other electrode.

7. In combination with an electric welding machine of the type comprising a pair of electrodes, a support, a conduit head of electrically conducting material hingedly connected to the support and having a cooling-liquid passageway therein, a welding current cable comprising two conductors and a cooling-liquid passageway therethrough, one conductor being connected to the head, a flexible electrical connector connecting the head to one electrode, a flexible electrical connector connecting the other conductor to the other electrode, the cooling-liquid passageway of the cable communicating with the passageway of the head, and conduit means for circulating cooling liquid through the cable and head and passageways.

8. In combination with an electric welding machine of the type comprising a pair of electrodes provided with a cooling-liquid electrode passageway and being movable with respect to work to be welded, a conduit head of electrically conducting material hingedly supported on the machine and having a cooling-liquid passageway therein, a pair of welding current conductors having a cooling-liquid passageway associated therewith, one conductor being connected to the head and a flexible electrical connector connecting it to one electrode, a flexible electrical connector connecting the other conductor to the other electrode, the said associated cooling-liquid passageway communicating with the passageway of the head, and conduit means for circulating cooling liquid through the said associated passageway, electrode passageway and head passageway.

9. A connector device for the cooling liquid and electrical systems of a welding apparatus, comprising a head and means for hingedly supporting it, a liquid passageway in the head, means for connecting a cooling-liquid conduit to the head in sealed communication with its passageway, means for attaching to the head the terminal of a cable of the type comprising a liquid-cooling passageway, with the cable passageway in sealed communication with the passageway in the head, and the head being provided with means for attaching a flexible electrical connector thereto.

10. In combination with an electric welding machine of the class comprising a cooling liquid passageway, means to support the machine for universal movement relative to work to be welded, a supplemental support on the machine, a conduit head, means mounting the head on the supplemental support providing for universal movement thereof relative to the machine, flexible cooling-liquid conduit means connecting the head and the passageway, and conduit means for conducting cooling liquid through the passageway, conduit means and head.

11. In combination with an electric welding machine of the class comprising a pair of electrodes, means to support the machine providing for universal movement of the electrodes relative to work to be welded, a supplemental support on the machine, an electrically conducting head connected to the supplemental support by means providing for universal movement thereof relative to the machine, a pair of welding current conductors, one conductor being connected to the head, a flexible electric connector connecting the head to one electrode and a flexible electric connector connecting the other conductor to the other electrode.

12. In combination with an electric welding machine of the type comprising a pair of electrodes provided with liquid cooling electrode passageways, means to support the machine providing for universal movement of the electrodes relative to work to be welded, a supplemental support on the machine, a conduit head of electrically conducting material connected to the supplemental support by means providing for universal movement thereof relative to the machine, and having a cooling liquid passageway therein, a pair of welding current conductors having a cooling-liquid passageway associated therewith, one conductor being connected to the head, and a flexible electrical connector connecting the head to one electrode, a flexible electrical connector connecting the other conductor to the other electrode, the said associated cooling liquid passageway communicating with the passageway of the head, and conduit means for circulating cooling liquid through the said associated passageway, and head passageway and electrode passageways.

LYNN S. BURGETT.